(12) United States Patent
Kreischer et al.

(10) Patent No.: US 10,315,889 B2
(45) Date of Patent: Jun. 11, 2019

(54) BLOCKING UNIT FOR A LIFTING DEVICE AND LIFTING DEVICE FOR A MOTOR VEHICLE SUBASSEMBLY

(71) Applicant: TKR SPEZIALWERKZEUGE GMBH, Gevelsberg (DE)

(72) Inventors: Torsten Kreischer, Wetter (DE); Thorsten Weyland, Herdecke (DE)

(73) Assignee: TKR Spezialwerkzeuge GmbH, Gevelsberg (DE)

( * ) Notice: Subject to any disclaimer, the term of this patent is extended or adjusted under 35 U.S.C. 154(b) by 0 days.

(21) Appl. No.: 15/902,185

(22) Filed: Feb. 22, 2018

(65) Prior Publication Data

US 2018/0237273 A1    Aug. 23, 2018

(30) Foreign Application Priority Data

Feb. 22, 2017 (DE) .................. 10 2017 103 599

(51) Int. Cl.
*B66C 1/10* (2006.01)
*B62D 65/02* (2006.01)
*B66C 1/42* (2006.01)

(52) U.S. Cl.
CPC .............. *B66C 1/10* (2013.01); *B62D 65/022* (2013.01); *B62D 65/026* (2013.01); *B66C 1/42* (2013.01); *B66C 1/107* (2013.01)

(58) Field of Classification Search
CPC .. B66C 1/10; B66C 1/42; B66C 1/107; B25H 1/0007; B62D 65/022; B62D 65/026; B66F 7/22; B66F 7/28
See application file for complete search history.

(56) References Cited

U.S. PATENT DOCUMENTS

| 6,553,260 | B1* | 4/2003 | Skoldengen | A61N 1/37252 607/27 |
| 7,296,787 | B2* | 11/2007 | Barrios | B25H 1/0014 254/133 R |
| 8,226,140 | B1* | 7/2012 | Dietrich | B66C 1/42 294/119.1 |
| 8,235,334 | B1* | 8/2012 | Kobal | F16M 11/041 248/122.1 |
| 2007/0080549 | A1* | 4/2007 | Jenney | B66C 1/10 294/81.3 |
| 2016/0152448 | A1 | 6/2016 | Kreischer | |

FOREIGN PATENT DOCUMENTS

DE    102014117703 A1    6/2016

* cited by examiner

*Primary Examiner* — Stephen A Vu
(74) *Attorney, Agent, or Firm* — Laurence A. Greenberg; Werner H. Stemer; Ralph E. Locher (57) ABSTRACT

A lifting device for a motor vehicle subassembly has a load-bearing unit with at least one support arm that can be pivoted around a longitudinal axis of the load-bearing unit and a coupling unit that is arranged on the support arm for releasably connecting the support arm to the motor vehicle subassembly. The coupling unit is mounted on the support arm such that it is longitudinally displaceable, and the load-bearing unit is configured to connect with a crane unit, such as a crane hook adapter. The lifting device is especially compact in construction in that it offers the possibility of being combined with lifting units for the disassembly of motor vehicle subassemblies from the ground. The load-bearing unit is releasably connected with a connecting body of a support unit. The connecting body is tiltable on the support unit.

12 Claims, 10 Drawing Sheets

BLOCKING UNIT FOR A LIFTING DEVICE AND LIFTING DEVICE FOR A MOTOR VEHICLE SUBASSEMBLY

CROSS-REFERENCE TO RELATED APPLICATION

This application claims the benefit, under 35 U.S.C. § 119, of German patent application DE 10 2017 103 599.0, filed Feb. 22, 2017; the prior application is herewith incorporated by reference in its entirety.

BACKGROUND OF THE INVENTION

Field of the Invention

The invention relates to a blocking unit for a lifting device as well as a lifting device for a motor vehicle subassembly, having
a load-bearing unit with at least one support arm that can be pivoted around a longitudinal axis of said load-bearing unit and
a coupling unit that is arranged on the support arm for releasably connecting the support arm to the motor vehicle subassembly, wherein the coupling unit is mounted on the support arm such that it is longitudinally displaceable, and the load-bearing unit is configured to connect with a crane unit and in particular has a crane hook adapter.

Lifting devices of the aforementioned type are employed in particular in automotive workshops to remove motor vehicle subassemblies, such as drive assemblies as vehicle engines, wherein the load-bearing unit of the lifting device is aligned opposite the assembly to be removed by the positioning of the support arm. After the motor vehicle subassembly has been connected via the coupling unit situated on the support arm and once the motor vehicle subassembly has been detached from the vehicle, the removed assembly can then be lifted out of the vehicle by means of a crane unit attached to the crane hook adapter of the load-bearing unit.

To dismantle motor vehicle subassemblies that have to be removed from an underside of the vehicle, it is necessary that the load-bearing unit be combined with a support device that permits the lifting device to be connected with known lifting units, which are usually provided in automotive workshops and which can be positioned below the motor vehicle subassembly that is to be dismantled, e.g. after the vehicle has been raised by a car lift. A connection can be established with the assembly to be removed via the load-bearing unit, and the removed assembly can then be taken out of the vehicle by a backward movement of the lifting device.

However, known lifting devices of the aforementioned type have the disadvantage that they must be designed to connect with a lifting unit having a correspondingly configured support unit, which permits both the connection to the lifting unit and the alignment of the load-bearing unit. The support device being usually permanently arranged below the load-bearing unit, effects, however, that the lifting device in total has a high dead weight and requires a large construction volume, even though it is used only in conjunction with a crane unit.

SUMMARY OF THE INVENTION

It is accordingly an object of the invention to provide a blocking unit for a lifting device and lifting device for a motor vehicle subassembly which overcomes the above-mentioned and other disadvantages of the heretofore-known devices and methods of this general type and which is especially compact in construction and which, if required, offers the possibility of being combined with lifting units for the disassembly of motor vehicle subassemblies from the ground. It is a further object of the invention to provide a blocking unit for a lifting device, which permits the reliable placement of a support arm in a set position.

With the foregoing and other objects in view there is provided, in accordance with the invention, a lifting device for a motor vehicle subassembly, the lifting device comprising:
a support unit and a connecting body tiltably arranged on said support unit;
a load-bearing unit releasably connected to said connecting body on said support unit;
a load-bearing unit having a longitudinal axis and at least one support arm pivotally disposed about the longitudinal axis of said load-bearing unit, said load-bearing unit being configured for connection with a crane unit; and
a coupling unit disposed on said at least one support arm for releasably connecting said support arm to the motor vehicle subassembly, said coupling unit being mounted on said support arm for longitudinal displacement along said support arm.

The lifting device according to the invention, which is particularly useful as a transmission jack and an engine hoist, has a load-bearing unit that is releasably connected with a connecting body of a support unit, wherein the connecting body of the support unit can be tilted.

The lifting device according to the invention comprises two assemblies, namely the load-bearing unit on the one hand, which can be connected to the motor vehicle subassembly that is to be removed via coupling units arranged on the support arm(s), and the support unit on the other hand, which can be releasably connected to the load-bearing unit as required, wherein the support unit then offers the possibility of connecting the load-bearing unit with lifting devices that are usually present in automotive workshops. To connect the support unit with the load-bearing unit, the support unit has a connecting body that can be connected to the load-bearing unit so that, a stable connection with the load-bearing unit can be established as needed using this connecting body.

When the load-bearing unit is used in combination with a crane unit, i.e. when the use of a support unit is not necessary, the releasable arrangement of the load-bearing unit to the connecting body of the support unit can easily separate it from the load-bearing unit, resulting in a compact load-bearing unit that permits the simple top-side removal of a motor vehicle subassembly from the vehicle. Using the crane hook adapter on the load-bearing unit, for example, an engine unit that is being removed can easily be lifted out of the vehicle using a crane unit, wherein the load-bearing unit with no support unit requires only a small amount of installation space. Within the scope of the application, an upper-side removal is understood to mean taking vehicle components out of the vehicle from above, and an underside removal is understood to mean taking vehicle components out of the vehicle from below—based on its operating position.

The support unit is characterized in that the connecting body, which is configured to connect with the load-bearing unit, can be tilted relative to the remaining support unit. The tiltability of the connecting body permits the plane spanned by the support arm(s) to be tilted relative to the assembly that is to be removed until it is arranged in the position required for the removal. The ability of the coupling units to be displaced onto the support arms, wherein the connection with the removed assembly is established on the coupling units, and the tiltability of the support arm(s) make it possible for the lifting device to be aligned optimally relative with the assembly which is to be removed so that it is possible to establish a reliable and stable connection with the assembly to be removed. When the load-bearing unit is used without a support unit, i.e. when it is used for the top-side removal of motor vehicle subassemblies, the releasable arrangement of the support unit makes it easy to remove it, and so the load-bearing unit can be aligned relative to the assembly to be removed in a simpler way.

The adjustability of the support arm relative to the support unit in combination with the displaceability of the coupling unit, which is configured e.g. to receive bolts to be connected to the transmission or eye bolts to be connected to the engine unit, offers the possibility of optimally adapting the lifting device to the motor vehicle subassembly to be removed. Owing to the configuration of the lifting device according to the invention, the load-bearing unit can be displaced into any desired position relative to the lifting unit and/or crane unit, and so various motor vehicle subassemblies, such as transmissions of different models and vehicle types, can be supported and then removed using the lifting device according to the invention. The use of the lifting device according to the invention thus makes it possible to omit additional assembly-specific lifting devices, and so automotive repair shops equipped with the lifting device according to the invention may forgo additional lifting devices for removing further assemblies, which would require significant storage space and high costs. Moreover, the use of the lifting device according to the invention allows a motor vehicle subassembly, especially for a transmission or engine, to be removed and installed by only one person.

The ability of the support arm or further arms to pivot about the longitudinal axis of the load-bearing unit, which is normally congruent with the longitudinal axis of the crane unit or is flush with the load-suspension point of a crane unit, ensures both a high variability of the lifting device and that the forces acting upon the load-bearing unit can be reliably absorbed by the crane unit or transmitted to the support unit that can be connected to the load-bearing unit and thus to the lifting unit that can be connected to the support unit. Owing to the pivotability of the support arm or arms about the longitudinal axis of the load-bearing unit and the displaceability of the coupling units along the support arms, the coupling unit arranged on the support arm(s) can be arranged at any desired point on the surface defined by the pivotability and length of the support arms. The additional tiltability of this surface permits an optimal adaptation to a multitude of motor vehicle subassemblies and their installation situations in the motor vehicle.

The connecting body on the support unit can generally be configured to tilt in any desired way. However, an especially advantageous embodiment of the invention provides that the connecting body is arranged on the support element via a radial pivot bearing unit, wherein it is particularly preferred that the radial pivot bearing unit has a radial pivot bearing with an inner ring that is connected to the remaining support unit and with an outer ring that is connected to the connecting body.

The use of a radial pivot bearing unit represents an especially simple and reliable option for configuring the connecting body of the support unit to tilt relative to the remaining support unit. The advantageous use of a simple radial pivot bearing allows an especially compact, tiltable arrangement of the connecting body to be produced on the support element. In addition, the radial pivot bearing unit ensures a reliable transmission of all forces acting upon the load-bearing unit to the support unit and to a lifting unit that is connected to the support unit.

In principle, the way in which the tilt adjustment of the connecting body as well as a locking for the adjusted tilt are configured can be freely selected. However, an especially advantageous embodiment of the invention provides that one and preferably two length-adjustable tilt adjusters, which are offset from each other by 90° and arranged around a longitudinal axis, are connected to the connecting body at one end and to the support unit by a bottom ring at the other end.

The use of tilt adjusters of this type is distinguished by the fact that the adjustability of the length of the tilt adjuster allow the tilt angle of the connecting body and thus of a load-bearing unit connected to said connecting body to be adjusted relative to the support unit in an especially simple and convenient way. Owing to the connection between the connecting body and a bottom ring of the support unit, adjusting the length of the tilt adjuster causes an adjustment to an angle of the connecting body and thus the angle of the load-bearing unit that is connected to the connecting body and therefore, ultimately, the angle of a plane spanned by one or more support arms relative to the support element.

The use of a second tilt adjuster that is offset from the first tilt adjuster by 90° permits a second angle of the load-bearing unit and of the spanned plane respectively, which is offset by 90°, to be adjusted so that a plane spanned by one or more support arms can be tilted by the two tilt adjusters offset from each other by 90° as a function of the adjustable length of the tilt adjusters in any given direction about the longitudinal axis of the support element in the manner of a tumbling motion. The length adjustability of the tilt adjusters can thus be configured in different ways. One possible embodiment consists in the use of a handle having two inner screw threads running in the same direction, wherein each of the inner screw threads accommodate a connecting means that is connected to a bottom ring of the support unit and/or the connecting body of the support unit such that rotating the handle causes the spacing of the connecting means to change. In case of a self-inhibiting embodiment of the inner screw thread, separate locking means for the set position can be omitted.

In principle, the support unit can be configured to connect with a lifting unit in any given manner, as long as it is ensured that the support unit is held securely on the lifting device that is normally present. According to an especially advantageous embodiment of the invention, however, it is provided that bottom ring is configured for the coaxial connection and/or a coupling body of the support unit is configured for an axial connection with a connecting section of a lifting unit.

In particular, the especially advantageous use of both a bottom ring that can be arranged coaxially to a connecting section in conjunction with a coupling body that can be arranged axially to the connecting section is characterized in that the support unit can be placed in a stationary position on the lifting unit in an especially reliable way. Particularly with the high loads and associated risk in the event of an inadvertent shift, stationary mounting is of particular importance, since this is a very effective way to prevent accidents. In addition, this embodiment of the support unit connection is especially easy to configure and makes it simpler for the support unit to be connected to and removed from the lifting unit.

The pivotable arrangement of the support arms can be configured in any desired way. An advantageous embodiment of the invention provides that bearing bodies that are arranged on the support arms can be displaced within a connecting link of the load-bearing unit. The use of a connecting link and a bearing body adapted to the link ensures a particularly reliable arrangement of the support arm on the load-bearing unit, and thus a particularly reliable support of the support arms as well as a good transmission of the forces acting on the support arms to the load-bearing unit.

In principle, the embodiment of the bearing body that connects the support arm to the load-bearing unit and that is preferably rigidly connected to the support arm is freely selectable. However, it is particularly advantageous to provide that the bearing body extends in the direction of the longitudinal axis of the load-bearing unit, with one end being pivotably mounted on the load-bearing unit by means of a ball bearing along an annular guide path running coaxially to the longitudinal axis of the load-bearing unit, and with the other end being pivotably mounted on the load-bearing unit by means of a bearing ring arranged on the bearing body, wherein the bearing ring can be pivotably arranged on a guide bolt.

According to this embodiment of the invention, the longitudinal axis of the bearing body extends parallel to the longitudinal axis of the load-bearing unit. Accordingly, the support arm runs perpendicularly to the longitudinal axis of the load-bearing unit and of the bearing body. With a bearing roller arranged on the lower end of the bearing body—relative to the operating position—the bearing body abuts the annular guide path of the load-bearing unit. Connecting the bearing body by means of a bearing roller in the guide path ensures particularly easy and reliable adjustability of the support arm relative to the load-bearing unit. To secure the positions of the bearing body relative to the load-bearing unit, the bearing body additionally has a bearing ring in the area of its upper end opposite the bearing roller, relative to the operating position, said bearing ring extending perpendicularly toward a guide bolt and coaxially surrounding the guide bolt in the operating position so that the bearing body as a whole can be pivoted about the longitudinal axis of the load-bearing unit or the guide bolt respectively but cannot be tilted relative to it, and so a particularly effective transmission of force as well as a highly secure position of the support arm are ensured.

The number of support arms of the load-bearing unit may be freely selected, in principle, and can be determined in accordance with the intended use. It is particularly advantageous for the load-bearing unit to have three or four support arms, which are adjustably mounted about a longitudinal axis of the load-bearing unit. Accordingly, the arrangement is such that the support arms can be pivoted on a common, coaxial circular path about a longitudinal axis of the load-bearing unit. The bearing rings of the individual support arms are each arranged in different grooves in a load section of the bearing body such that the bearing rings—viewed in the direction of the longitudinal axis of the load-bearing unit—are arranged one above the other on a guide section.

According to this embodiment of the invention, it is thus provided that the individual bearing rings of the individual support arms each run in different planes perpendicular to the longitudinal axis of the load-bearing unit, and so the load-bearing unit can be configured to be especially compact. Accordingly, each support arm is guided over a rolling body at one end over a bearing ring at the other end, wherein the individual bearing rings of the respective support arms, as viewed in the direction of the longitudinal axis, are arranged at a distance from each other.

The position of the individual support arms of the load-bearing unit can be defined in any desired way, as needed. According to a particularly advantageous embodiment of the invention, however, the support arm is provided with a blocking unit that is adjustable between a released position, which releases the support arm to pivot, and a locked position, which fixes the support arm on the load-bearing unit.

According to this embodiment of the invention, the support arm has a blocking unit, which makes it possible to reliably set the adjusted position of the support arm, i.e. the position pivoted relative to the load-bearing unit. In this way, operational safety can be increased in a particular way, once the adjusted position of the support arm(s), which is necessary to remove the motor vehicle subassembly, has been reliably secured.

The blocking unit that can be immovably fixed to the support arm permits the support arms to be reliably attached to the load-bearing unit. Essential to the blocking unit for a lifting device according to the invention is that it has a brake body that can be displaced toward a housing main body of the load-bearing unit by means of an actuation means, especially a tension lever, wherein the brake body friction locks the support arms to the housing main body when in the locked position.

The blocking unit according to the invention thus has a brake body that can be adjusted between a released position and a locked position by means of an actuating element, especially a tension lever. In the released position, the brake body is placed by the tension lever in a position, in which it permits the support arm that is connected to the blocking unit to pivot freely. In the locked position, by contrast, the tension lever effects an adjustment of the brake body such that it is forced against a housing main body of the load-bearing unit so that an additional adjustment of the support arm is blocked. The frictional connection between the brake body and the housing main body offers the advantage that, in principle, the support arm can be placed in any given angular position. Using the configuration of the brake body and its contact surface with the housing main body provides a convenient means for determining the force by means of which the tension lever must be actuated in order to shift it into the locked position.

According to an especially advantageous embodiment of the invention, it is further provided that the blocking unit has a latching unit that can be shifted between a released position and a latched position and that releasably locks the actuating element, especially the tension lever, in the locked position on a main body of the blocking unit. The use of a latching unit ensures in a particularly reliable way that the adjusted locked position of the blocking unit and thus the locked position of the support arm relative to the load-bearing unit is maintained during operation. An unintended release of the connection, which could cause an inadvertent pivoting of the support arm, is prevented in an especially reliable way by this embodiment of the blocking unit. The releasability of the latching unit thus ensures that the locked position can be released easily if required so that the support arm can be freely pivoted.

According to a particularly advantageous further embodiment of the invention, it is provided that the latching unit is pre-tensioned in the direction of the latched position. A corresponding pre-tensioning ensures in a particularly reliable way that an actuating element, especially a tension lever, that is in the locked position is automatically latched in this position by the latching unit. As a result of the pre-tension, e.g. by means of a suitable helical compression spring, which displaces a latching body into a latching receptacle on the tension lever, it is possible to ensure that the tension lever is automatically latched in the locked position without actuating it beforehand.

In principle, the movement of the tension lever can be transmitted to the brake body in any desired way. However, a particularly advantageous embodiment of the invention provides that the tension lever is pivotably mounted on the main body and is engaged by an outer contour to a push rod that is linearly displaceable on the main body and connected to the brake body. According to this development of the invention, the pivotably mounted tension lever has an outer contour that lies against a push rod that is linearly displaceable onto the main body and/or that is linearly displaceable on a roller. The outer contour is configured such that pivoting the tension lever, which is in contact with the push rod and/or a roller arranged on the push rod, displaces the push rod longitudinally within the main body. Therefore, this embodiment of the invention represents an especially simple possibility for transmitting the pivot motion of the pivot lever to the bake body, which, owing to the position of the pivot lever, reliably abuts a housing main body of the load-bearing unit under its own force when in the locked position, and so the support arm is blocked from pivoting any further. This embodiment of the invention is distinguished by its simplicity and compactness as well as reliability. This embodiment of the invention additionally makes it especially simple to provide the blocking unit with a latching unit that is advantageously provided.

In principle, the configuration of the controller for the latching unit, i.e. in particular the type of actuation, such that it is transferred from its latched position into a released position so that the tension lever can then be displaced, can be freely selected. However, an especially advantageous configuration of the invention provides that the latching unit can be adjusted from the latched position into the released position by means of a tension lever, wherein the tension lever runs parallel to the control lever when in the locked position.

According to this embodiment of the invention, it is provided that the control lever of the latching unit, by means of which the latching unit can be displaced from the locked position into the released position, extends parallel to the tension lever when said tension lever is arranged in the position assigned to the locking position. A corresponding alignment of the control lever relative to the tension lever permits a single-hand operation of the blocking unit, wherein the control lever of the latching unit can be displaced by the thumb, for instance, and then the tension lever can be adjusted with the remaining hand.

The adjustment of the lifting device, i.e. the alignment of the support arm or support arms to the guide unit, and any tilt of the receiving unit relative to the support device in the event of use with a lifting unit, has to be effected on principle in consideration of the motor vehicle subassembly to be removed, wherein conventional bearing points are provided on it, by which the motor vehicle subassembly to be removed can be supported and/or lifted. For example, the support arms can be set merely in purely visual alignment by the user, wherein this must be done directly using the motor vehicle subassembly to be removed, normally within a restricted working environment. According to a particularly advantageous embodiment of the invention, however, it is provided that an angular scale is arranged on the guide unit, and an indicator element alignable with the angular scale is arranged on the support arm.

According to this embodiment of the invention, the support arm can be easily fixed in a predetermined position using an indicator element, and the angular scale which is arranged on the guide unit. When data specific to the motor vehicle assembly are available, it is therefore possible to perform an alignment of the support arms independently of the vehicle so that the lifting device can then immediately be placed, without any further adaptations, in the set position on the motor vehicle subassembly to be removed and can be connected to it. Ideally, specific data for each motor vehicle subassembly are available that permit a corresponding adjustability of the support arms in advance using the indicator element and the angular scale.

Furthermore, it is particularly preferable for the support arm to have a length scale and for the coupling unit to have an indicator element for aligning the coupling unit on the support arm. Similar to aligning the support arm to the angular scale, the use of a length scale and an indicator element arranged on the coupling unit allows for the longitudinal alignment of the coupling unit to the support arm so that, when corresponding data are available, the support arms as well as the coupling units can be set independently of complicated tests with the motor vehicle component that is to be removed. Ideally, angle data is available for the support arms and length information is available for the coupling units for all motor vehicle subassemblies so that a user is offered a particularly convenient way of adapting the lifting device to any assembly to be removed in advance, and then using the lifting device without readjustment.

According to a particularly advantageous embodiment of the invention, when multiple support arms are used, for example, the support arms have different identifiers, in particular coloring that deviates from each other. A deviating coloration, which can be used alternately or in addition to e.g. a numbering to be carried out, or any other different means for identifying the support arms, e.g. with letters, makes it possible to adapt the load-bearing unit in a particularly convenient way when the data about the motor vehicle subassemblies is used in a prepared form. For instance, when colorations that differ from each other are used for the support arms, colored tables based on the data relating to the motor vehicle subassemblies can be provided which display an angular position associated with the respective colors as well as a length position of the coupling units of the respective support arms. This embodiment of the invention is advantageous in particular in a workshop, since it is quite user-friendly and prevents incorrect settings in a particularly easy manner. When four support arms are used, for example, each of them has a different color. A data card specific to the motor vehicle subassembly includes an angular position and a length position for each color so that the load-bearing unit can be quickly and effectively adapted to the respective motor vehicle subassembly.

According to an advantageous further embodiment of the invention, the coupling unit, which serves to connect to the motor vehicle subassembly, has a receiving opening arranged laterally to the support arm in order to receive a coupling adapter, wherein said coupling adapter can be clamped into the receiving opening or screwed into the receiving opening. The receiving opening makes it possible to receive adapters that have been adapted to the respective motor vehicle subassembly, which permits optimum support or a suspended receptacle for the respective motor vehicle subassembly. The coupling adapters and/or step bolts or eye bolts can be clamped and/or screwed into the receiving opening to ensure that the position of the coupling adapters is effectively secured. In addition, the lateral arrangement of the receiving opening in the coupling unit permits a particularly flat construction as well as a high variability of the lifting device in the event that the coupling unit provided according to an advantageous further embodiment of the invention is designed such that the coupling unit is borne on the support arm in a longitudinally movable manner, both with a receiving opening arranged on one side of the support arm, and a receiving opening arranged on the other side of the support arm.

The arrangement of the coupling unit on each side is understood to represent the possibility of rotating the coupling unit, i.e. to pull it off of the support arm and use it such that the receiving opening can be arranged on both the left and right side—based on its operating position—of the support arm depending on the direction in which it is pushed on. The variability of the lifting device is supplemented as a result, since the pivot range of the support arms, in particular two adjacent support arms, also depends on whether the receiving openings in the coupling units are facing away from each other or towards each other. The alignment of the coupling units can also be dictated by suitable data tables, and so the user can easily adapt the lifting device. In conjunction with an arrangement of the indicator element on the coupling unit that is eccentric relative to the support arm, the possibility of turning the coupling unit also makes it feasible to arrange a double scale on the support arm, i.e. two length scales arranged adjacent to each other.

According to a particularly advantageous embodiment of the invention, the coupling unit has a locking means, in particular a locking clip, to secure the coupling unit in the set position so that shifting and malfunction are reliably prevented. The locking clip clamps the coupling unit against the support arm.

Other features which are considered as characteristic for the invention are set forth in the appended claims.

Although the invention is illustrated and described herein as embodied in a blocking unit for a lifting device and a lifting device for a motor vehicle subassembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Referring now to the figures of the drawing in detail and first, particularly, to FIGS. 1A to 1D thereof, there is shown a lifting device 1, which can be used in a automotive repair shop as a transmission jack for removing a transmission unit, which is not shown here, from a motor vehicle. In order to connect to a transmission unit, the lifting device 1 has a load-bearing unit 2, which in the embodiment shown here comprises four support arms 3. The support arms 3 are arranged on a central guide unit of the load-bearing unit 2 such that they can pivot about a guide bolt 39. For its part, the load-bearing unit 2 is releasably connected via a housing main body 33 with a tiltable or inclinable upper shell 36 of a support unit 73, by means of which the lifting device 1 can also be connected to a lifting unit that is not shown here but is usually provided in automotive repair shops. For this purpose, the support unit 73 has a coaxially arrangeable bottom ring 72 and an axially arrangeable coupling body 15, which can be arranged together on a corresponding receptacle of a lifting unit and ensure a stable arrangement of the lifting device.

The pivotable arrangement of the support arms 3 makes it possible to move the support arms 3 relative to each other e.g. into a necessary position corresponding with the transmission unit to be removed. To movably mount the support arms 3, the ends of the support arms facing the guide bolt 39 are connected to a bearing body 23, which is adjustably arranged in a central guide unit. The bearing bodies 23 are connected to the support arms 3 by a threaded section 27 of a central rod 65 extending axially through the support arm 3, wherein said threaded section 27 can be screwed into the bearing body 23 at the end of the support arm 3 facing the guide bolt 39. At the ends facing away from the bearing body 23, the central rods 65 are fixed to the support arms 3 by a securing ring 68 that lies against a closure body 67. A closure cap 69 covers the securing ring 68.

Figure 1A:
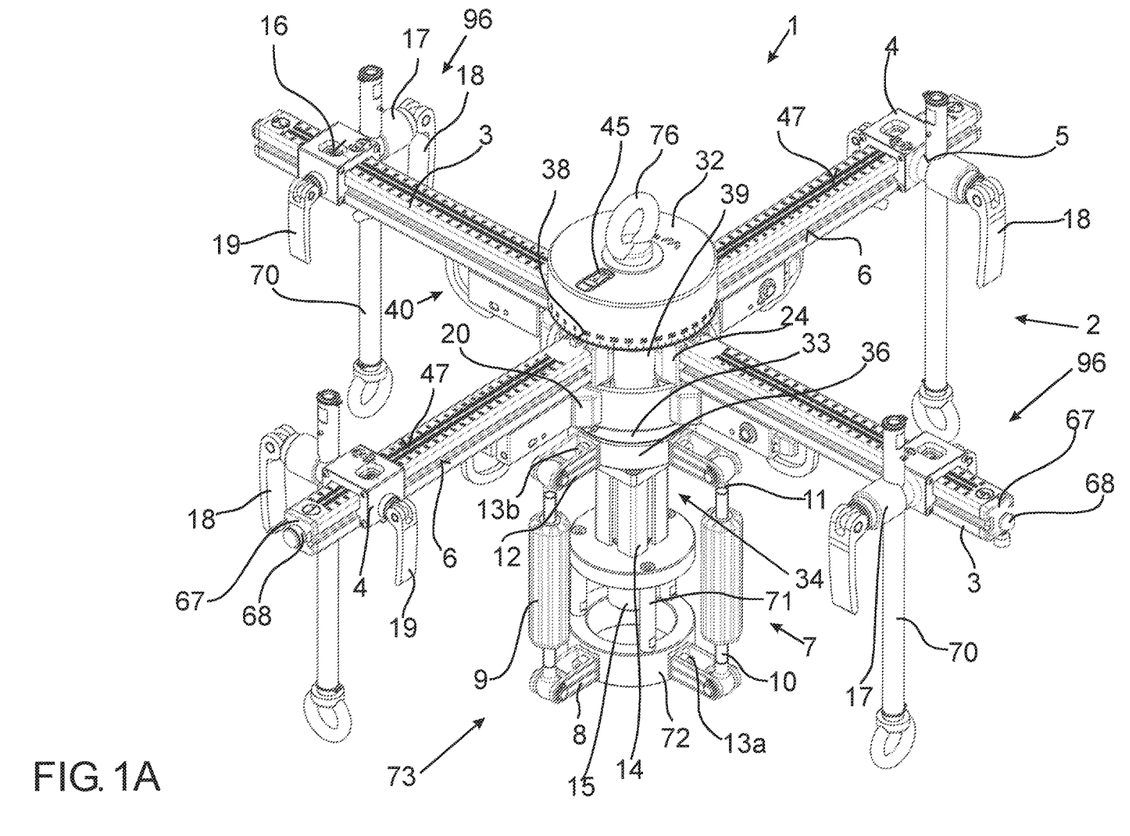
FIG. 1A is a perspective view of a lifting device with a load-bearing unit having four support arms and a support unit.
Figure 1B:
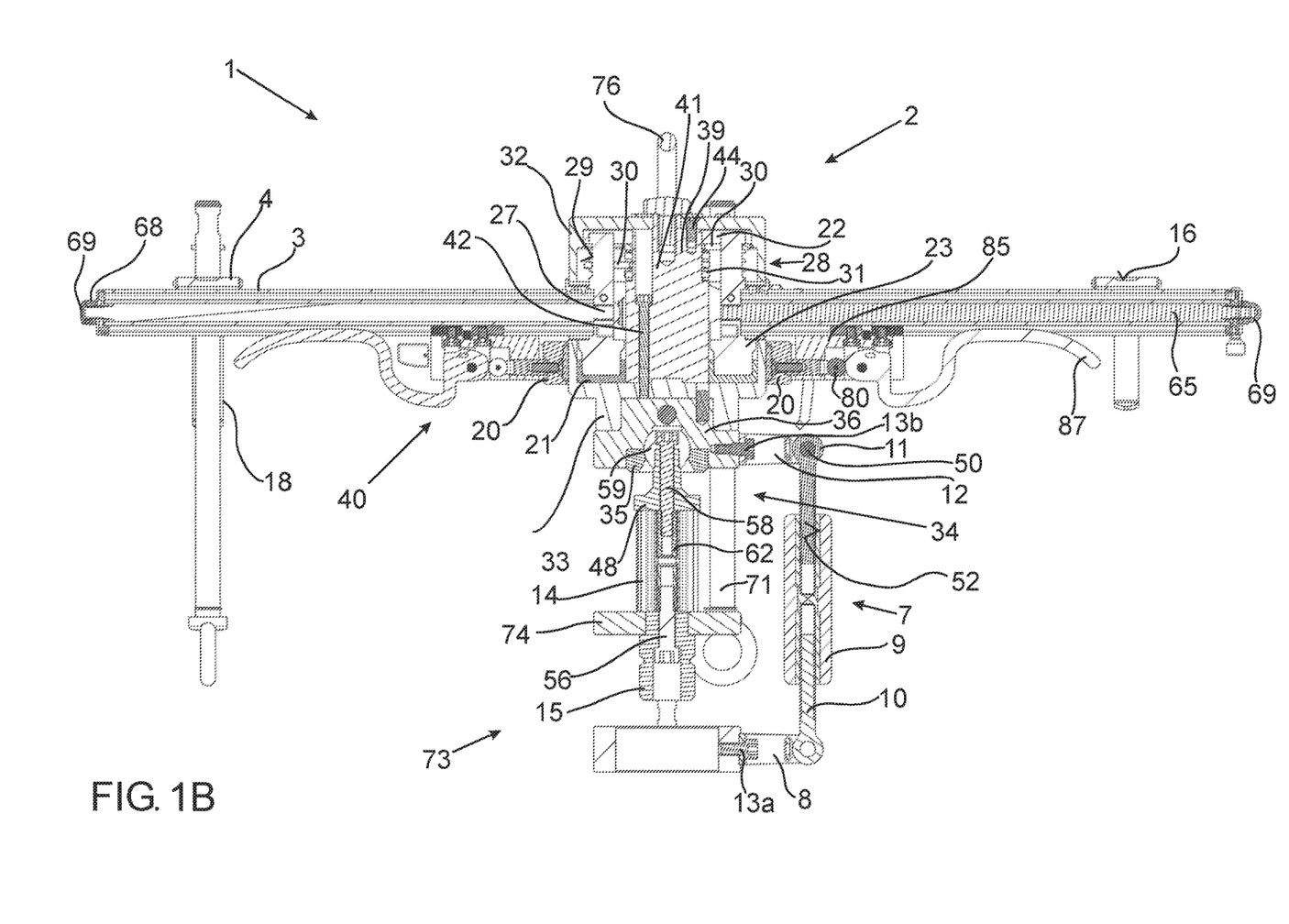
FIG. 1B is a sectional view of the lifting device in FIG. 1A.
Figure 1C:
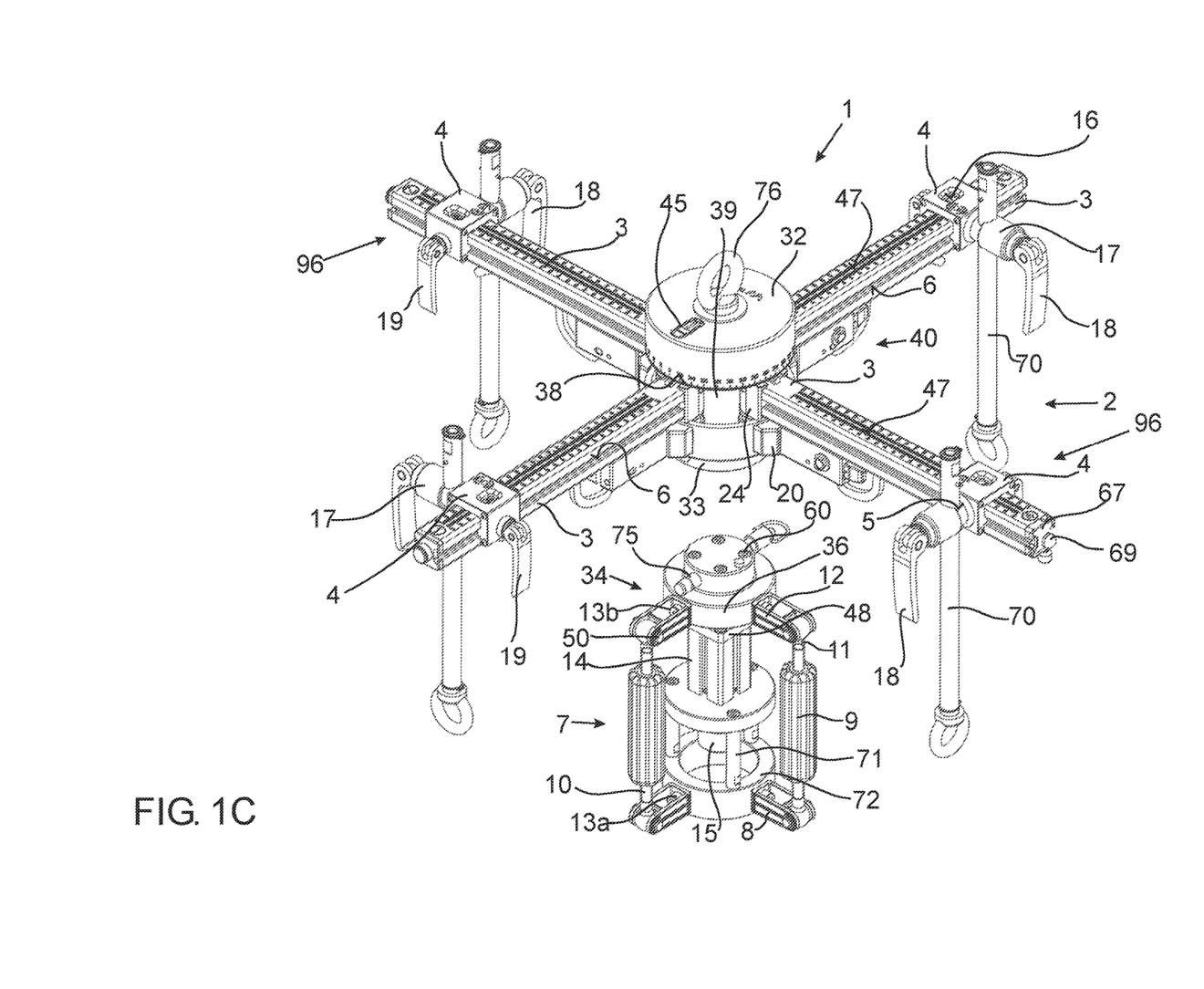
FIG. 1C is a perspective view of a load-bearing unit that has been separated from the support unit.
Figure 1D:
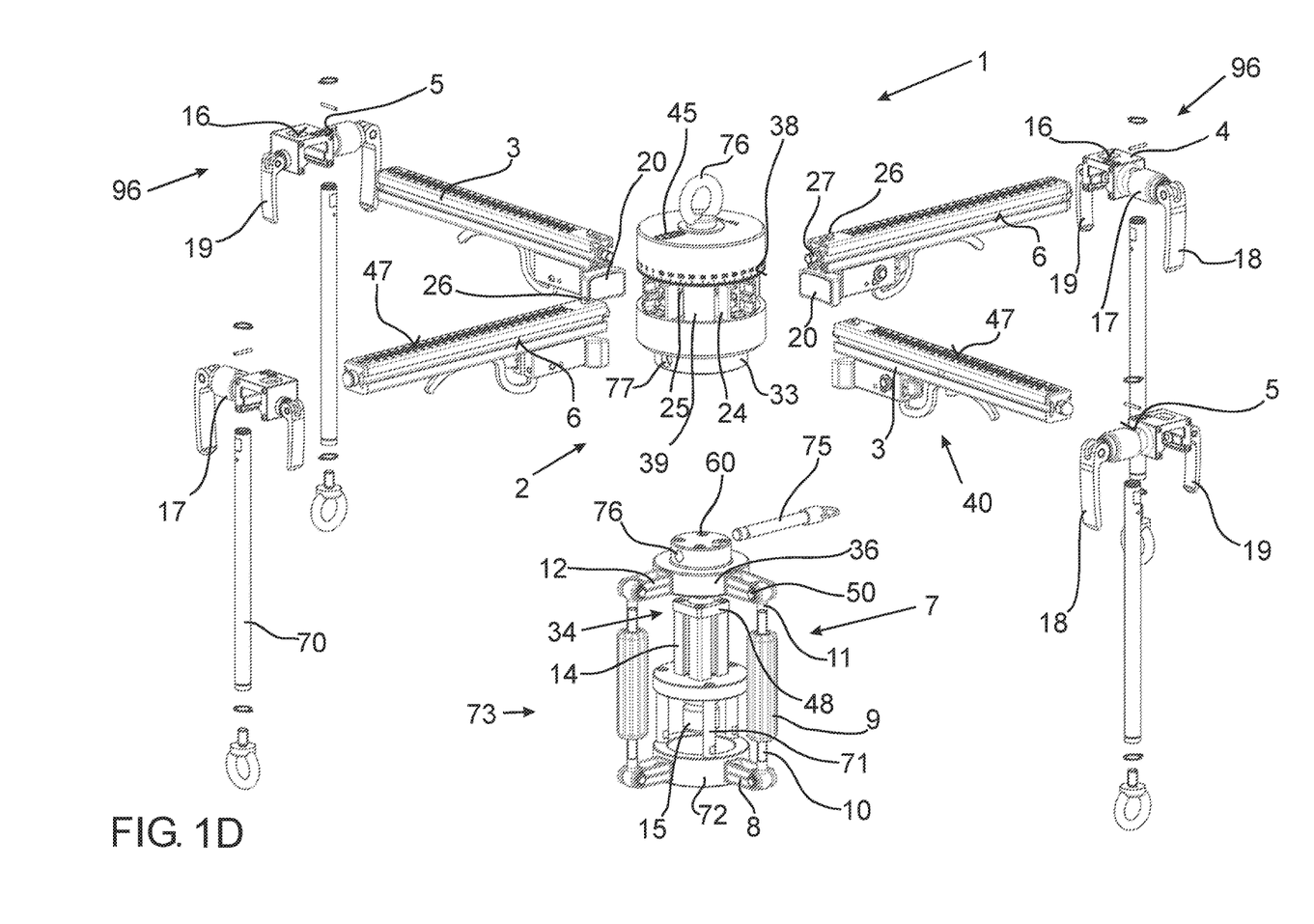
FIG. 1D is a partially exploded view of the lifting device in FIG. 1A.
Figure 2:
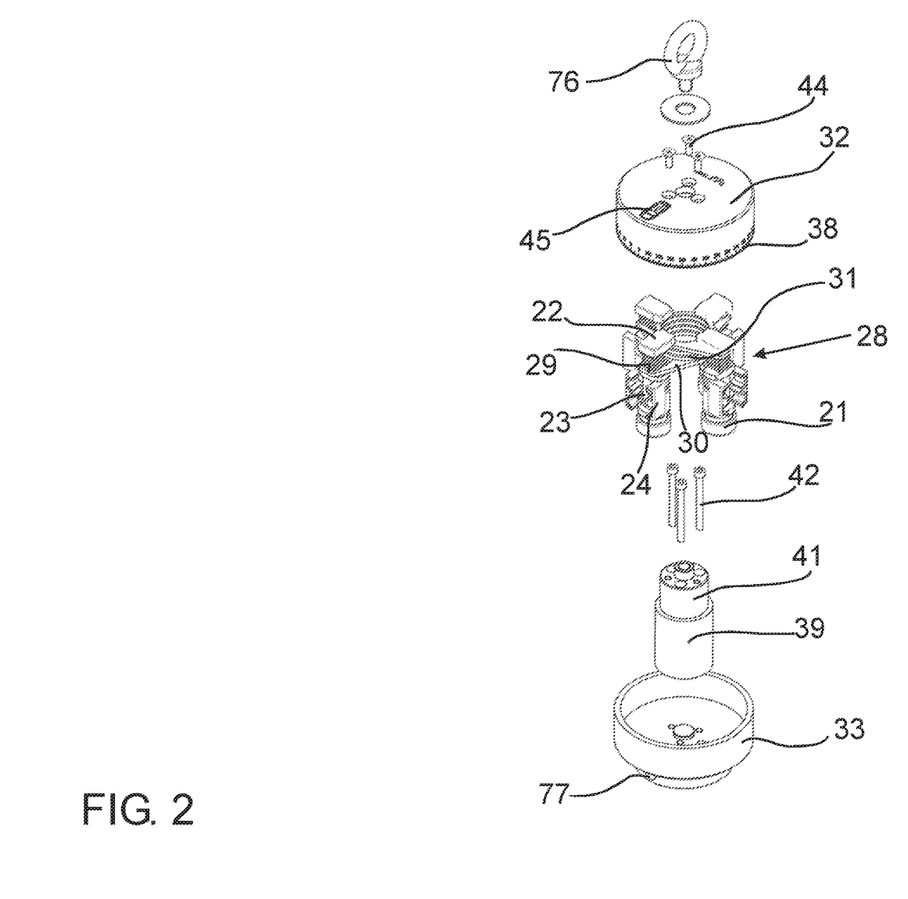
FIG. 2 is an exploded view of a central unit of the load-bearing unit.
Figure 3:
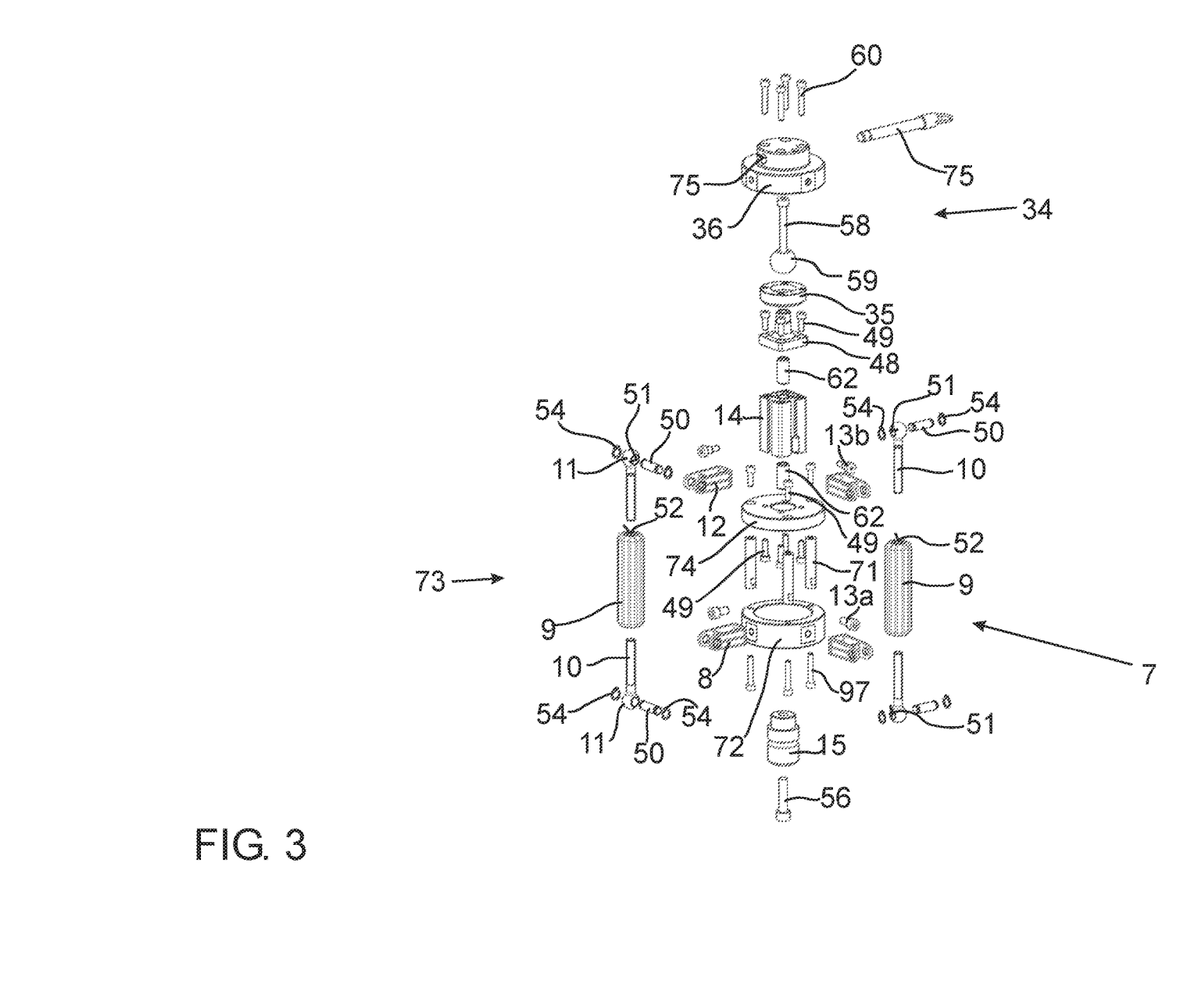
FIG. 3 is an exploded view of the support unit.
Figure 4:
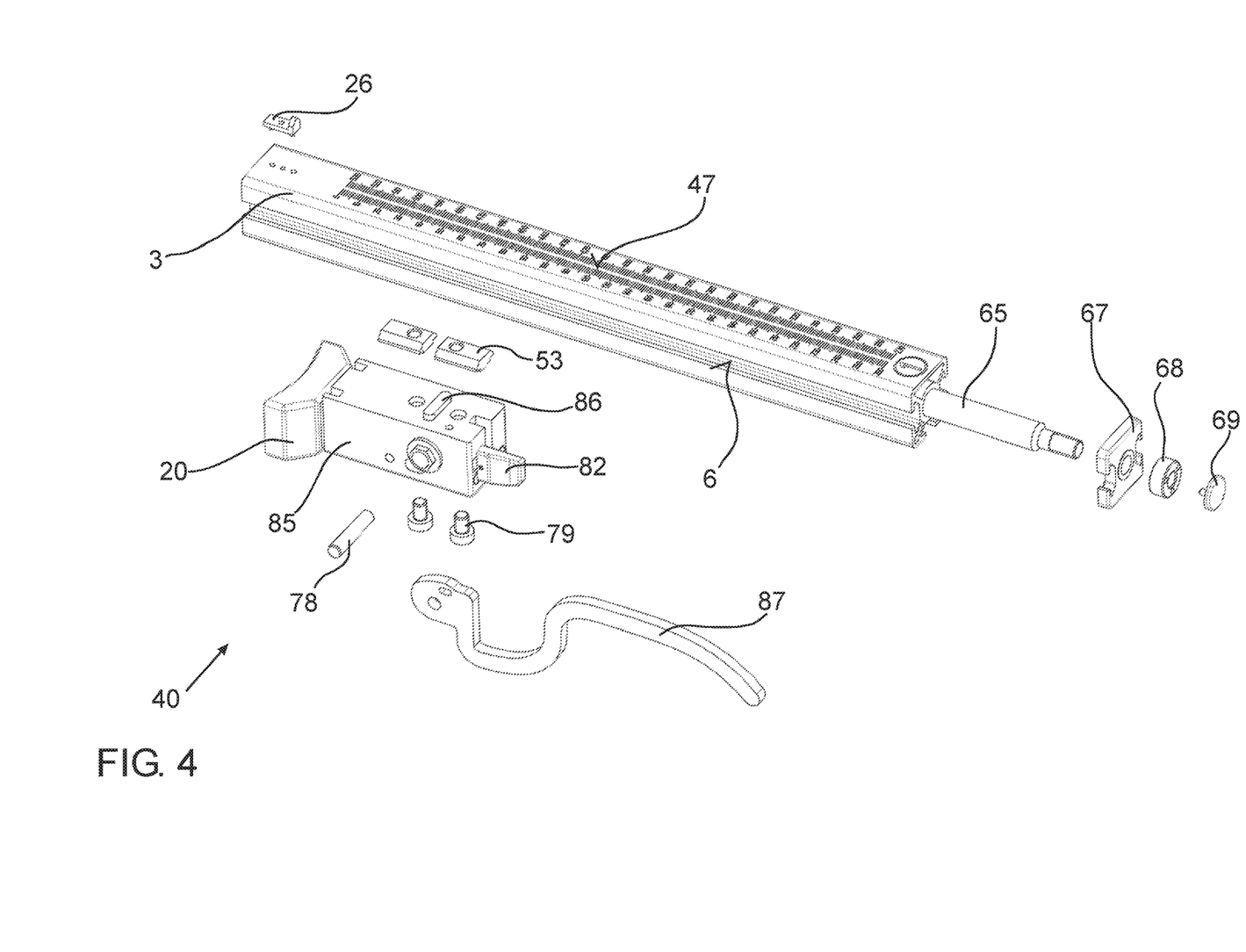
FIG. 4 is an exploded view of a support arm with a blocking unit arranged on it.
Figure 5A:
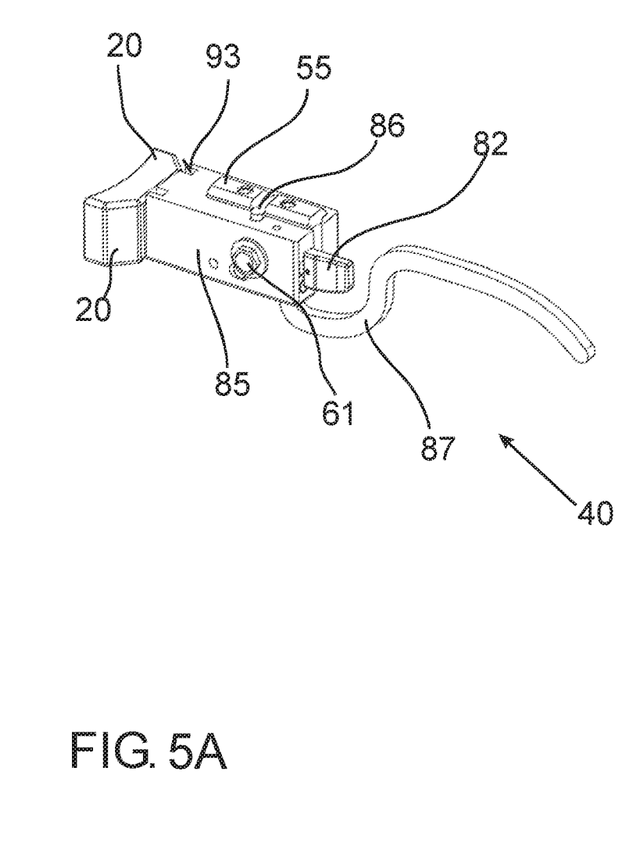
FIG. 5A is a perspective view of the blocking unit in FIG. 4.
Figure 5B:
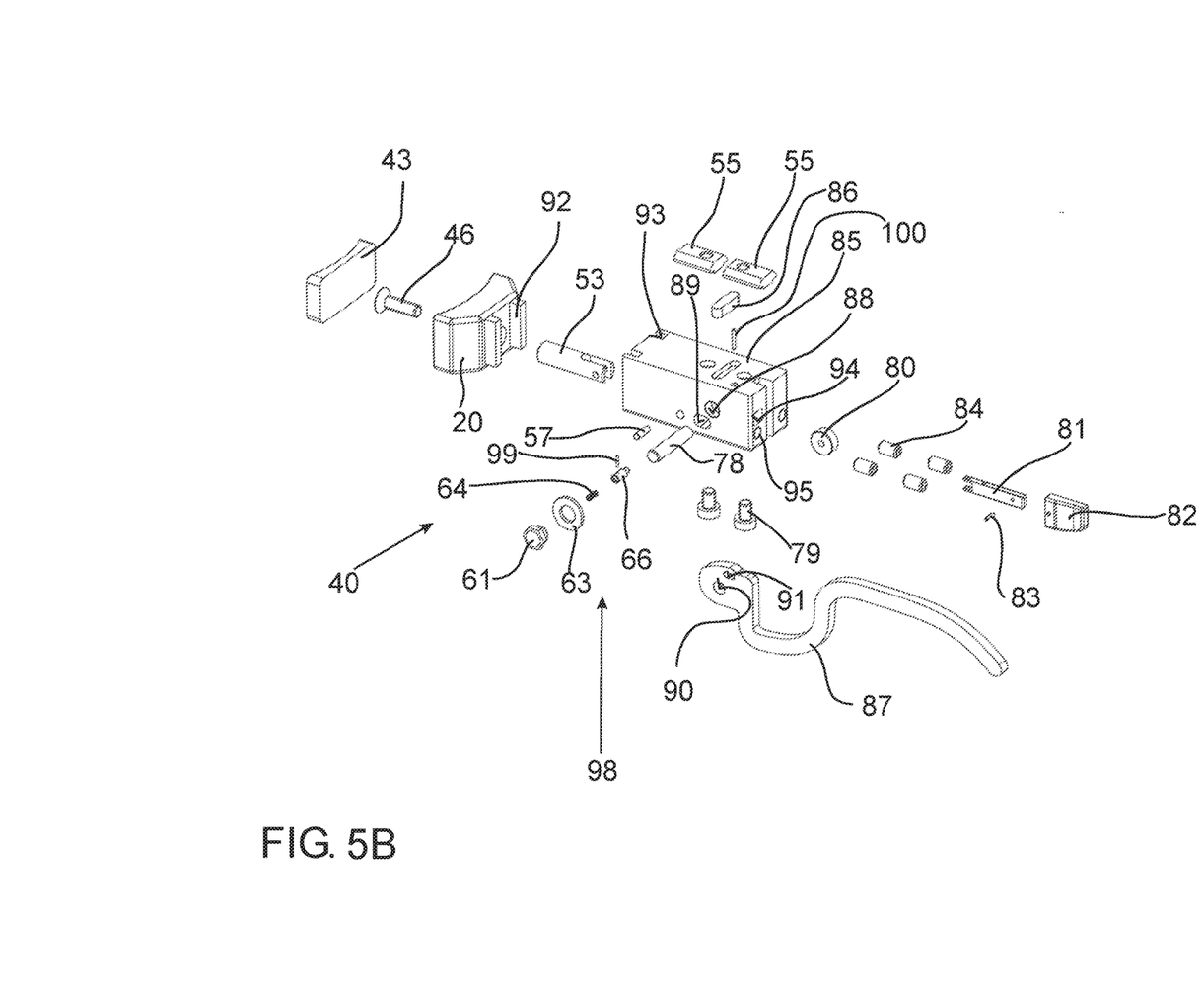
FIG. 5B is an exploded view of the blocking unit in FIG. 4.
Figure 6A:
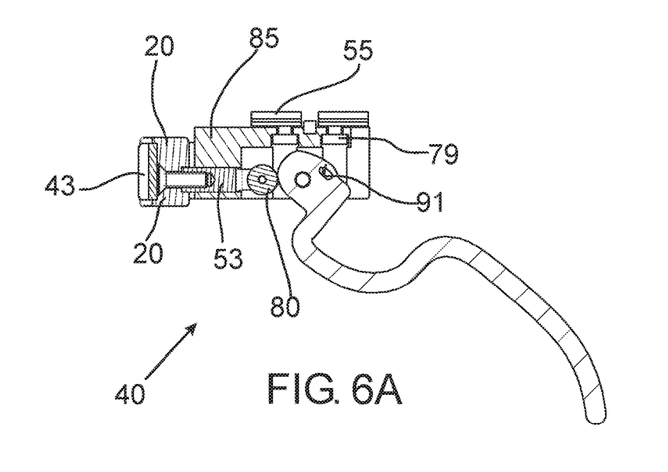
FIG. 6A is a first sectional view of the blocking unit in a released position.
Figure 6B:
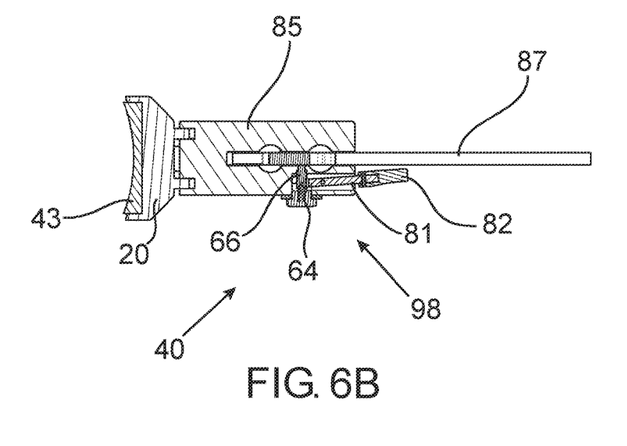
FIG. 6B is a second sectional view of the blocking unit in a released position.
Figure 7A:
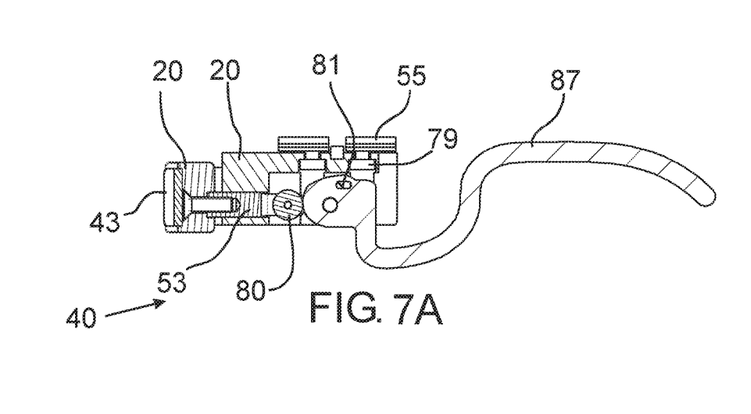
FIG. 7A is a first sectional view of the blocking unit in the locked position.
Figure 7B:
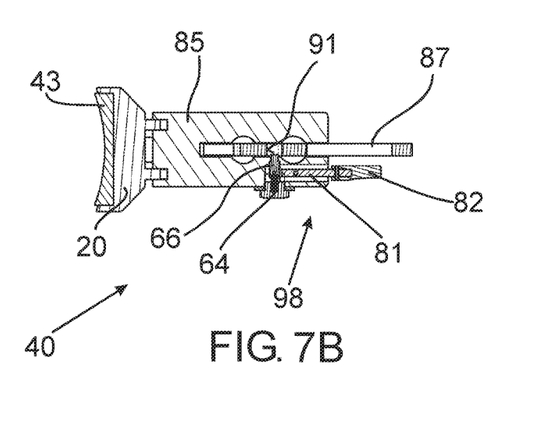
FIG. 7B is a second sectional view of the blocking unit in the locked position.

The position of the bearing body 23 on the support arm 3 is further secured by means of two retaining shells 24, which are arranged laterally on the support arm 3 and the attachment screws 25 of which extend through a through-hole in the respective bearing body 23. Furthermore, the support arms 3 have recesses on the upper side for receiving an indicator element 26, and they are immovably fixedly connected to the support arm 3 (cf. FIGS. 2 and 4).

The bearing body 23 has on its lower side—relative to the position of installation and operation—a roller 21, which is borne in a guide path running coaxial to the guide bolt 39 of the housing main body 23 of the guide unit. On its end opposite the roller 21, the bearing body 23 has a locking section 28 with a plurality of grooves 29. The grooves 29 serve to receive a bearing ring 30, wherein the bearing rings 30 of the four employed bearing arms 3 are arranged in overlaid grooves 29—as viewed in the direction of the longitudinal axis of the bearing body—which deviate from each other.

Viewed in direction of the longitudinal axis of the guide bolt 39, the overlaid arrangement of the bearing rings 30 thus permits them to be in an overlaid coaxial arrangement in a guide section 41 of the guide bolt 39. The intermediate rings 31 arranged in the direction of the longitudinal axis between the bearing rings 30 ensure friction-free adjustment of the bearing arms 3 on the guide unit. The support arms 3 can additionally be supported in each settable position by a bearing ring, which abuts a lower side of the support arms 3 and is fastened to a peripheral bar of the housing main body 33 of the guide unit. The support arms 3 are furthermore guided on an inner side of a housing cover 32 of the guide unit by means of bearing caps 22, which are placed at the end of the latching section 28 opposite the roller 21.

The housing cover 32, which forms a slot-like connecting link for the support arms 3 by its arrangement at a distance from the housing main body 33, is immovably fixed to the bearing bolt 39 by fastening screws 44. Furthermore, the housing cover 32 has an angular scale 38 as well as an indicator 45 on its periphery. The indicator element 26 abuts the angular scale 38, and so the support arms 3, which differ in color, can be set in a predetermined position by the indicator element 26.

To lock the support arms 3 in the set position relative to the housing main body 33, a blocking unit 40 is immovably arranged to each of the support arms 3. Each of the blocking units 40 has a brake body 20, which can be adjusted relative to a main body 85 of the blocking unit 40 that is connected to the support arm 3. The brake body 20 and the brake pad 43 arranged on it can be adjusted between a released position and a locked position by a tension lever 87 that is pivotably mounted on the main body 85.

In the locked position, the brake pad 43 of the brake body 20 is pressed against an outer side of the housing main body 33, wherein the ability of the support arm 3 to pivot is blocked by the pressing force. For the force-fitting arrangement of the brake pad 43 against the outer sider of the housing main body 33, the tension lever 87 can be adjusted between positions associated with the locked position and the released position. In the locked position, the tension lever 87 exerts pressure on a roller 80 arranged on a push rod 53 by means of its outer contour. The push rod 53, which can be displaced linearly toward the main body 85, is connected to the brake body 20 at its end opposite the roller 80, wherein webs 92 on the brake body 20 that engage in grooves 93 on the main body 85 limit the displacement toward the main body 85. Thus in the locked position, the tension lever 87 presses the brake pad 43 against the housing main body 33 by means of the push rod 53, as a result of which the support arm 3 is locked.

To support the tension lever on the main body 85, a cylinder pin 78 extends through an opening 89 on the main body 85 and an opening 90 on the tension lever 87. To lock the tension lever 87 in the locked position, a latching unit 98 of the blocking unit 40 has a cylinder pin 57 that is pre-tensioned in the direction of the tension lever 87 by a compression spring 64. In the locked position, the cylinder pin 57, which is arranged within an opening 88 on the main body 85, engages in a slot 91 on the tension lever 87 and thereby blocks the tension lever 87 from pivoting about a pivot axis. The compression spring 64 is supported by its end opposite the cylinder pin 57 on a screw closure 61, which is screwed into the opening 88 in the main body 85 with the interposition of a disc 63.

A lever 81 arranged in a passage 94 in the main body 85 serves to unlock the blocking unit 40 and is pivotably mounted on the main body 85 by means of a cylinder pin 100 and is connected to the cylinder pin 66 by a bolt 99. By actuating the lever 81 using a button 82 that is installed on it by means of a clamping pin 83, the cylinder pin 66 is moved out of the slot 91 counter to the pre-tension applied by the compression spring 64, and so the tension lever 87 can then be pivoted out of the locked position into the released position (cf. FIG. 4-7b).

Two slot nuts 55 attached to the main body 85 by screws 79 as well as one feather key 86 are used to arrange the blocking unit 40 on the support arm 3. The roller is mounted on the push rod 53 by means of a cylinder pin 57. Threaded pins 84 disposed in bore holes 95 serve to fix the components in place. The brake body 20 is attached to the push rod 53 by means of a fastening screw 42.

In addition to an indicator 45, which displays a plan view of a vehicle, for example, and thus easily permits an alignment of the adjusted lifting device 1 relative to the vehicle so that there is e.g. an optimal adaptation to the load carrying points of the transmission that is to be removed, the support arms 3 have two length scales 47 arranged next to each other that enable the alignment of a coupling unit 96 mounted on the support arms 3 such that it is longitudinally displaceable. The coupling units 96 in this case have a sleeve 4 that is adapted to the cross-section of the support arms 3 and that has an opening 16, which is arranged eccentrically to the support arm 3 in the coupling unit 96 and which permits a precise alignment of the sleeve 4 with one of the two length scales 47, depending on the on direction in which they are pushed onto the support arm 3, wherein the opening 16 case can also be provided with an indicator for this purpose. The sleeves 4 guided within a groove 6 of the support arms 3 are fixed in a set position by a locking clip 19, which clamps the sleeve 4 against the support arm 3.

To connect the coupling unit 96 to a transmission that is to be removed, the coupling unit 96 has a receiving opening 5 arranged on the side that is designed to receive the retaining rods 70 shown here, for instance, and a motor vehicle component can be suspended by the eyelets at their ends. A clamping element 17, which can be displaced toward the retaining rod 70 by a tension lever 18, serves to fix the retaining rods 70 in the receiving opening 5 so that it is immovably secured in the retaining opening 5.

The guide bolt 39 is immovably connected to the housing main body 33 of the guide unit by fastening screws 42. The housing main body 33, in turn, can be releasably connected to a radial joint bearing unit 34 of the supper unit 73. To connect the housing main body 33 to the radial joint bearing unit 34, the housing main body 33 has a central opening and an opening 77 running transversely to the direction of the longitudinal axis, said opening being configured to receive a securing bolt 75 that, when the guide unit is installed on the support unit 73, extends through the opening 77 on the housing main body 33 and an opening 76 on a recessed rim on the upper shell 36. The upper shell 36 and the lower shell 35 are fixed to each other by fastening screws 60. A radial pivot bearing 59 is arranged in the housing of the radial joint bearing unit 34 formed between the upper shell 36 and lower shell 35. An outer ring of the radial pivot bearing 59 is fixed between the upper shell 36 and lower shell 35. An inner ring of the radial pivot bearing 59 is fastened by a fastening screw 58 to a bearing section of a bearing seat 48 of the support unit 73. Said fastening screw 58 extends through the bearing seat 48 into a threaded sleeve 62 arranged on a support rod 14. The upper shell 36 of the radial joint bearing unit 34 and the load-bearing unit 2 that is connected to said radial joint bearing unit 34 can therefore be tilted relative to a longitudinal axis of the support unit 73.

The support unit 73 has the central support rod 14, to which the bearing seat 48 is fixed by fastening screws 49 as well as by the bearing locking screw 58 that is screwed into a threaded sleeve 62. The support unit 73 has a coupling body 15 on the end opposite the bearing seat 48. This is attached via a fastening screw 56, which is screwed into a threaded sleeve 62 that is inserted into the support rod 14. A bottom ring 72 is arranged at a distance axial to the coupling body 15. Here the bottom ring 72 is distanced from a support disc 74 that is arranged on the support rod 14 by distance rods 71, wherein the distance rods 71 are connected with the support disc 74 via fastening screws 49 and with the bottom ring 74 via fastening screws 97. By means of the coupling body 15 and the bottom ring 72, it is possible to arrange the lifting device 1 on a lifting device normally available in motor vehicle workshops.

The support unit 73 has two tilt adjusters 7 arranged offset by 90° relative to each other to set a tilt of the load-bearing unit 2 via the radial pivot bearing unit 34. At one end, the tilt adjusters 7 are articulated to holders 12 connected to the upper shell 36 by fastening screws 13b. For this purpose, a bolt 50 extends through a bearing bush 51 of a bolt seat 11 of the tilt adjuster 7. The position of the tilt adjuster 7 is secured in the holder 12 by securing rings 54 gripping the bolt 50. Similarly, the tilt adjusters 7 are attached to the holders 8 that are arranged on the bottom ring 72. The holders 8 are attached to the bottom ring 72 by fastening screws 13a.

The ends of the threaded rods 10 opposite the bolt seats 11 are screwed into an inner screw thread 52 of a handle 9. Rotating the handle 9 thus brings about a change in length of the tilt adjuster 7 and thereby tilts the load-bearing unit 2 relative to a longitudinal axis extending through the longitudinal axis of the support rod 14. A plane spanned by the support arms 3 of the load-bearing unit 2 can therefore be tilted in any direction relative to the longitudinal axis of the support rod 14 by means of the two tilt adjusters 7, which are offset by 90° relative to each other and arranged around the support rod 14.

The following is a summary list of reference numerals and the corresponding structure used in the above description of the invention:

| | |
|---|---|
| 1 | Lifting device |
| 2 | Load-bearing unit |
| 3 | Support arm |
| 4 | Sleeve |
| 5 | Receiving opening |
| 6 | Groove |
| 7 | Tilt adjuster |
| 8 | Holder |
| 9 | Handle |
| 10 | Threaded rod |
| 11 | Bolt seat |
| 12 | Holder |
| 13a | Fastening screw |
| 13b | Fastening screw |
| 14 | Support rod |
| 15 | Coupling body |
| 16 | Indicator element/opening |
| 17 | Clamping element |
| 18 | Tension lever |
| 19 | Locking clip |
| 20 | Brake body |
| 21 | Roller |
| 22 | Bearing cap |
| 23 | Bearing body |
| 24 | Retaining shell |
| 25 | Fastening screw |
| 26 | Indicator element |
| 27 | Threaded section |
| 28 | Latching section |
| 29 | Groove |
| 30 | Bearing ring |
| 31 | Intermediate ring |
| 32 | Housing cover |
| 33 | Housing main body |
| 34 | Radial joint bearing unit |
| 35 | Lower shell |
| 36 | Upper shell |
| 38 | Angular scale |
| 39 | Guide bolt |
| 40 | Blocking unit |
| 41 | Guide section |
| 42 | Fastening screw |
| 43 | Brake pad |
| 44 | Fastening screw |
| 45 | Indicator |
| 47 | Length scale |
| 48 | Bearing seat |
| 49 | Fastening screw |
| 50 | Bolt |
| 51 | Bearing bush |
| 52 | Inner screw thread |
| 53 | Push rod |
| 54 | Securing ring |
| 55 | Slot nut |
| 56 | Fastening screw |
| 57 | Cylinder pin |
| 58 | Bearing locking screw |
| 59 | Radial pivot bearing |
| 60 | Fastening screws |
| 61 | Screw closure |
| 62 | Threaded sleeve |
| 63 | Disc |
| 64 | Compression spring |
| 65 | Central rod |
| 66 | Cylinder pin |
| 67 | Closure body |
| 68 | Securing ring |
| 69 | Cap |
| 70 | Retaining rod |
| 71 | Distance rods |
| 72 | Bottom ring |
| 73 | Support unit |
| 74 | Support disc |
| 75 | Securing bolt |
| 76 | Opening |
| 77 | Opening |
| 78 | Cylinder pin |
| 79 | Screws |
| 80 | Roller |
| 81 | Lever |
| 82 | Button |
| 83 | Clamping pin |
| 84 | Threaded pin |
| 85 | Main body |
| 86 | Feather key |
| 87 | Tension lever |
| 88 | Opening |
| 89 | Opening |
| 90 | Opening |
| 91 | Slot |
| 92 | Web |
| 93 | Groove |
| 94 | Passage |
| 95 | Bore hole |
| 96 | Coupling unit |
| 97 | Fastening screws |

-continued

| 98 | Latching unit |
| 99 | Bolt |
| 100 | Cylinder pin |

The invention claimed is:

1. A lifting device for a motor vehicle subassembly, the lifting device comprising:
   a support unit and a connecting body tiltably arranged on said support unit;
   a load-bearing unit releasably connected to said connecting body on said support unit, said load-bearing unit having a longitudinal axis and at least one support arm pivotally disposed about the longitudinal axis of said load-bearing unit, said load-bearing unit being configured for connection with a crane unit, said load-bearing unit having a housing main body;
   said support arm having a blocking unit on an outside of said support arm being adjustable between a released position releasing and allowing said support arm to pivot, and a locked position fixing said support arm on said load-bearing unit;
   said blocking unit including a brake body configured for displacement toward said housing main body, said brake body being configured to friction lock said support arm to said housing main body in said locked position;
   an actuator for displacing said brake body toward said housing main body; and
   a coupling unit disposed on said at least one support arm for releasably connecting said support arm to the motor vehicle subassembly, said coupling unit being mounted on said support arm for longitudinal displacement along said support arm.

2. The lifting device according to claim 1, wherein said load-bearing unit has a crane hook adapter for connection to the crane unit.

3. The lifting device according to claim 1, which comprises a radial pivot bearing unit mounting said connecting body on said support unit.

4. The lifting device according to claim 1, which comprises a length-adjustable tilt adjuster offset from a longitudinal axis of said support unit, said tilt adjuster having one end connected to said connecting body at an opposite end connected to a bottom ring of said support unit.

5. The lifting device according to claim 4, wherein said length-adjustable tilt adjuster is one of a two length-adjustable tilt adjusters that are disposed at an offset from each other of 90° around the longitudinal axis of said support unit.

6. The lifting device according to claim 4, wherein said bottom ring of said support unit is configured for a coaxial connection and/or wherein a coupling body of said support unit is configured for an axial connection with a connecting section of a lifting unit.

7. The lifting device according to claim 1, wherein said actuator is a tension lever.

8. The lifting device according to claim 1, which comprises a latching unit to be shifted between a released position and a latched position, wherein said latching unit is configured to releasably lock said actuating element in the locked position on a main body of the blocking unit.

9. The lifting device according to claim 8, wherein the latching unit is pre-tensioned in a direction of the latched position.

10. The lifting device according to claim 8, wherein said actuator is a tension lever and wherein said latching unit is adjustable from the latched position into the released position by way of a control lever that runs parallel to said tension lever when in the locked position.

11. The lifting device according to claim 1, wherein said actuator is a tension lever that is pivotally mounted on the main body and is engaged by an outer contour to a push rod that is linearly displaceable on the main body and connected to said brake body.

12. An assembly, comprising:
   a lifting device for lifting a motor vehicle subassembly, the lifting device including a support unit and a connecting body tiltably arranged on said support unit, a load-bearing unit releasably connected to said connecting body on said support unit, said load-bearing unit having a longitudinal axis and at least one support arm pivotally disposed about the longitudinal axis of said load-bearing unit, said load-bearing unit being configured for connection with a crane unit;
   a coupling unit disposed on said at least one support arm for releasably connecting said support arm to the motor vehicle subassembly, said coupling unit being mounted on said support arm for longitudinal displacement along said support arm; and
   a blocking unit for said lifting device, said blocking unit being disposed on an outside of said support arm, said blocking unit including a brake body configured for displacement toward a housing main body of said load-bearing unit by way of an actuator, said brake body being configured to friction lock said support arm to said housing main body in the locked position.

* * * * *